May 20, 1941.                E. W. JOHNSON                2,242,215
UNIVERSAL JOINT
Filed Feb. 14, 1939

Inventor
Edwin W. Johnson
By John F. Heine
Attorney

Witness:
Godfrey Reing

Patented May 20, 1941

2,242,215

UNITED STATES PATENT OFFICE 2,242,215

UNIVERSAL JOINT

Edwin W. Johnson, Trumbull, Conn., assignor to The Singer Manufacturing Company, Elizabeth, N. J., a corporation of New Jersey Application February 14, 1939, Serial No. 256,324

3 Claims. (Cl. 287—100)

This invention relates to universal joints adapted especially for use in sewing machine pitman connections and has for its primary object to provide an inexpensive and simple construction designed to simplify the eradication of inaccuracies of fit which have heretofore been difficult and expensive to deal with on a mass production basis.

A further object of the present invention is the provision of a power-transmitting connection having intermediate its ends a universal joint which can be manufactured easily and accurately with the aid of simple machining operations and a commercial hardened steel ball.

Prior to the present invention it has been common practice in the manufacture of power transmitting connections such as pitmans, which are adapted to transmit power at an angle to the planes of action of the pitman driving and driven elements, to employ the so-called "ball-and-socket connection" at either or both ends of the connection. In these devices the ball element is turned down on a lathe or similar machine and it is well known that the production of a ball in this manner is an expensive machining operation and is difficult of accurate consummation. In the present pitman, the construction and method of manufacture of which will hereinafter be described in detail, only simple machining operations are required to provide suitable sockets in the connection members for a steel ball which can be purchased commercially in large quantities at a relatively low cost per ball.

For a better understanding of the present invention reference may be had to the accompanying drawing, in which Fig. 1 is a side elevation of a pitman embodying the present invention.

Figure 1:
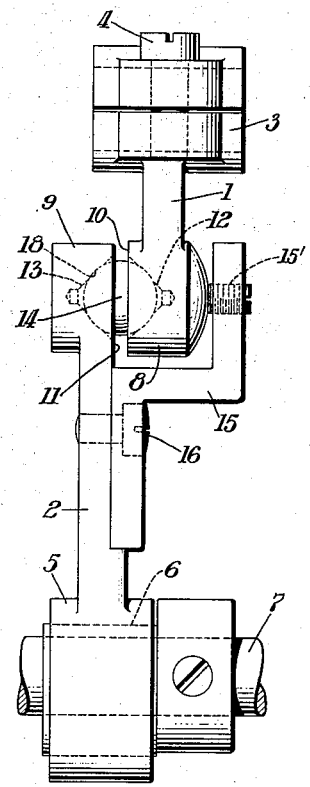
Figure 2:
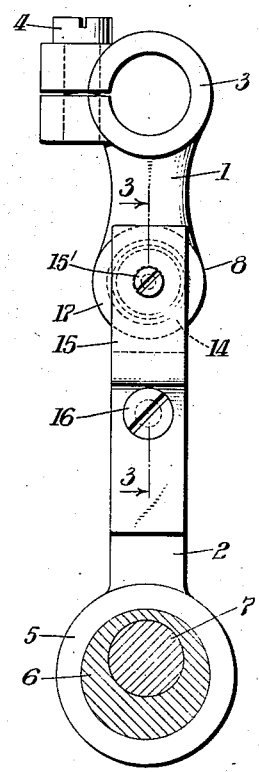
Fig. 2 is an end elevation of Fig. 1.

As disclosed in the drawing, the power transmitting connection selected for illustration purposes only, comprises a crank-arm section 1 and a lower pitman section 2. The crank-arm section 1, at its upper end, is preferably formed with a split head 3 which is adapted to be frictionally clamped by means of a screw 4 upon a shaft or other element (not shown) of the machine to be driven by the pitman. The pitman 2, at its lower end, is preferably formed with a cylindrical strap 5 engaging an eccentric 6 secured upon a suitable actuating shaft 7. It will be understood that the specific construction of the remote ends 3 and 5 of the power transmitting connection are not intended to limit the invention set forth in the appended claims, but are chosen merely to disclose a practical form of connection. It will be understood also that the present invention may be incorporated in many different types of power transmitting connections where it is desirable to use a universal joint intermediate the ends of the connection.

Referring now to the universal ball-joint, it will be observed that the sections or members 1 and 2 have their adjacent end-portions formed into cylindrical heads 8 and 9 which are disposed in overlapping relation. Formed in the adjacent or inner faces 10 and 11 of the cylindrical heads 8 and 9 are oppositely disposed conical sockets 12 and 13 which are adapted to receive between them a hardened commercial steel ball 14. The diameter of the steel ball 14 and the sockets 12 and 13 are preferably of such size that the adjacent faces 10 and 11 of the cylindrical heads 8 and 9 are maintained spaced apart a distance permitting limited universal movement of one member relative to the other member.

Figure 3:
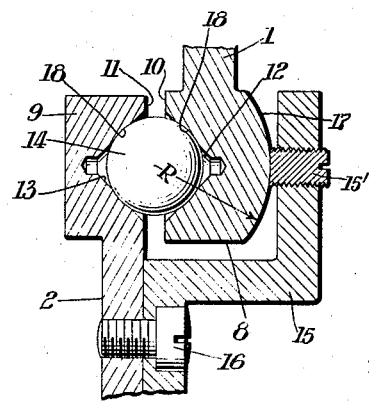
Fig. 3 represents an enlarged vertical sectional view, taken substantially along the line 3—3, Fig. 2.
Figures 5, 6:
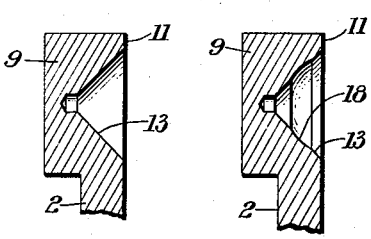
Fig. 5 is a vertical sectional view of one of the pitman sections, showing the shape of the ball-receiving socket after the drilling thereof and before the hardened steel ball has been pressed into the socket to provide a working seat for the ball.
Fig. 6 is a view similar to Fig. 5, except that the ball has been pressed into the socket and a working seat has been formed therefor.
Figure 4:
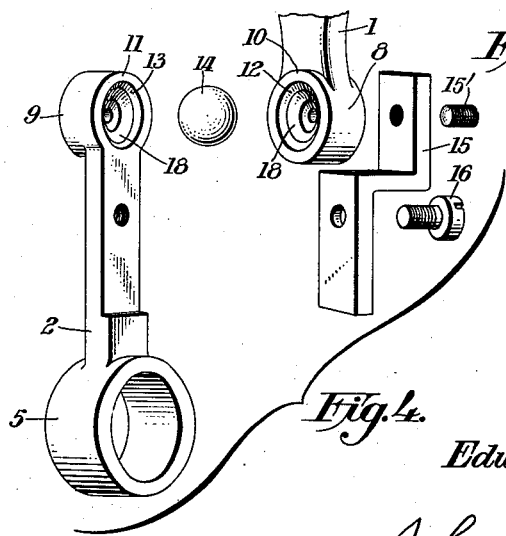
Fig. 4 is a disassembled perspective view of the universal joint of the pitman, illustrating the relative position of the various parts which constitute the joint.

The two cylindrical heads 8 and 9 of the members 1 and 2 are held in contact with the interposed steel ball 14 by means of a retaining arm 15 which is detachably secured upon the pitman member 2 by the screw 16. This retaining arm 15 has threaded into it an adjusting screw 15', the inner end of which is cupped and engages the semispherically formed outer surface 17 of the cylindrical head 8. In order that the crank-arm section 1 may move relative to pitman member 2 and about the steel ball 14 without binding, the radius of curvature of the semispherical surface 17, represented by R in Fig. 3, passes through the center of the steel ball 14. When constructed in this manner the semispherical surface 17 is concentric with the periphery of the ball 14, and thus the crank-arm section 1 can move readily about the steel ball 14 and beneath the retaining arm 15.

In view of the simplicity of construction of the present universal joint, a somewhat novel method can be followed in the manufacture of the same. The method preferably to be followed comprises, first, drilling into the cylindrical heads 8 and 9 the ball-receiving sockets 12 and 13 and, secondly, before the members 1 and 2 have been hardened, placing the commercial steel ball 14 into the sockets and applying sufficient pressure upon the cylindrical heads of the pitman sections to force or sink the ball into the softer metal so as to form a spherical ball-seat 18 therein. Subsequently, the members 1 and 2 can be hardened without affecting the shape of the ball-receiving sockets. It will be understood that the conical sockets 12 and 13 can be drilled successively with a conventional centering drill or any other common form of drill having the correct cutting-face angle. Obviously, the provision of the spherical seat 18 lengthens the life of the universal joint, inasmuch as it provides surface contact between the ball and each socket. Without such a seat the ball would engage each socket along line contact only and, after some use, play which would develop between the ball and sockets would render the connection too noisy for practical use.

From the foregoing description, it will be understood that I have provided a universal joint for power transmitting connections which can be produced with the aid of a simple drilling operation and a commercial steel ball. Further, I have provided a power transmitting connection having a universal joint between two members thereof, which joint can be assembled accurately and expeditiously.

It will be obvious that the present invention is susceptible of some change and modification without departing from the spirit thereof and for this reason I do not wish to be understood as limiting the invention to the precise arrangement and formation of the several parts herein shown and described except as hereinafter claimed.

Having thus set forth the nature of the invention, what I claim herein is:

1. A power transmitting connection comprising two members each of which has a ball-receiving socket opening into the inner face thereof, a ball interposed between said ball-receiving sockets, one of said members having formed upon its outer face and concentric with said ball a semi-spherical surface, and a retaining arm secured upon one of said members and engaging the semispherical surface of the other member for maintaining said members in contact with said ball.

2. A power transmitting connection comprising two members each of which has a ball-receiving socket formed therein, a ball interposed between said ball-receiving sockets, one of said members having formed upon its outer face and concentric with said ball a semispherical surface, a retaining arm secured upon one of said members, and an adjusting screw threaded into said retaining arm and engaging the semispherical surface of the other member for maintaining said members in contact with said ball.

3. A power transmitting connection comprising two members each of which has a socket opening into the inner face thereof and provided with a spherical ball-receiving seat, one of said members having formed upon its outer face a semispherical surface having a radius of curvature in excess of the radius of curvature of said spherical ball-receiving seat, a ball interposed between said ball-receiving seats, and a retaining arm secured upon one of said members and engaging the semispherical surface of the other member for maintaining said members in contact with said ball.

EDWIN W. JOHNSON.